United States Patent
Singh et al.

(10) Patent No.: US 12,007,977 B1
(45) Date of Patent: Jun. 11, 2024

(54) SELECTIVELY APPLYING A REPLICATION LOG FOR LOGICAL DATABASE REPLICA CREATION

(71) Applicant: Amazon Technologies, Inc., Seattle, WA (US)

(72) Inventors: Omendra Pratap Singh, Bellevue, WA (US); Jiancheng Wang, Providence, RI (US); Mostafa Elhemali, Seattle, WA (US); Sroaj Sosothikul, Seattle, WA (US); Jhansi Lakshmi Kolla, Snohomish, WA (US); Wan Man Ryan Chan, Seattle, WA (US); Somasundaram Perianayagam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/936,967

(22) Filed: Sep. 30, 2022

(51) Int. Cl.
   *G06F 16/23* (2019.01)
(52) U.S. Cl.
   CPC .............. *G06F 16/2358* (2019.01)
(58) Field of Classification Search
   CPC .................................. G06F 16/2358
   See application file for complete search history.

(56) References Cited

U.S. PATENT DOCUMENTS

| | | | |
|---|---|---|---|
| 5,758,337 A | 5/1998 | Hammond | |
| 8,510,270 B2 | 8/2013 | Pareek et al. | |
| 2005/0138306 A1 | 6/2005 | Panchbudhe et al. | |
| 2017/0371567 A1* | 12/2017 | Piduri | G06F 3/065 |
| 2019/0325055 A1 | 10/2019 | Lee et al. | |
| 2022/0334725 A1* | 10/2022 | Mertes | G06F 16/275 |

* cited by examiner

*Primary Examiner* — Mariela Reyes
*Assistant Examiner* — Courtney Harmon
(74) *Attorney, Agent, or Firm* — S. Scott Foster; Kowert, Hood, Munyon, Rankin & Goetzel, P.C.

(57) ABSTRACT

Selective application of log records may be performed. A target storage node for a new replica being added to a replica group for a database may obtain a paginated result of a scan of ordered items of the database from a source. The paginated result may have a log sequence number that corresponds to a replica log consistent with the paginated result. The target storage node may obtain log records from the replication log after the log sequence number for the paginated result. The target storage node may selectively apply the log records from the replication log according to one or more application rules that determine whether to ignore a change described in a log record.

20 Claims, 10 Drawing Sheets

SELECTIVELY APPLYING A REPLICATION LOG FOR LOGICAL DATABASE REPLICA CREATION

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data that can cope with the increasing demand upon data storage resources to provide highly performant access to data while still preserving the various management features that contribute to data availability and durability.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement selectively applying a replication log for logical database replica creation, according to some embodiments. Replica groups may be implemented for databases in various embodiments to provide resilience, durability, and additional request processing capacity (e.g., additional read requests) for a database in a database system. The benefits provided by replica groups are not without costs. For instance, high-performance database systems may rely upon special storage hardware (e.g., SSDs, non-volatile memory, etc.) to provide quick access to database data. While some copies of database data may be used for responding to requests, some copies that are used to increase durability and resiliency to failure may be hosted in the same costly storage technology.

Techniques to add replicas to a replica group may be performed to increase performance, availability, durability, or respond to failures or other scenarios, in various embodiments. While some techniques may rely upon physical copying techniques to add replicas to a replica group, various performance costs may be incurred. Write amplification, for example, occurs when multiple writes are performed in order to obtain, transform, and rewrite data into a new replica. Additionally, physical copying techniques may be tightly coupled to the capabilities of particular storage engines that provide access to a database replica. In various embodiments, techniques for selectively applying a replication log for logical database replica creation may implemented that avoid write amplification and other performance costs of physical copying techniques without sacrificing the consistency to be ensured when adding new replicas. Moreover, such techniques may be agnostic as to the underlying storage engine, allowing for different storage engines to be implemented for different storage nodes while still performing techniques to add a replica to a replica group.

Figure 1:
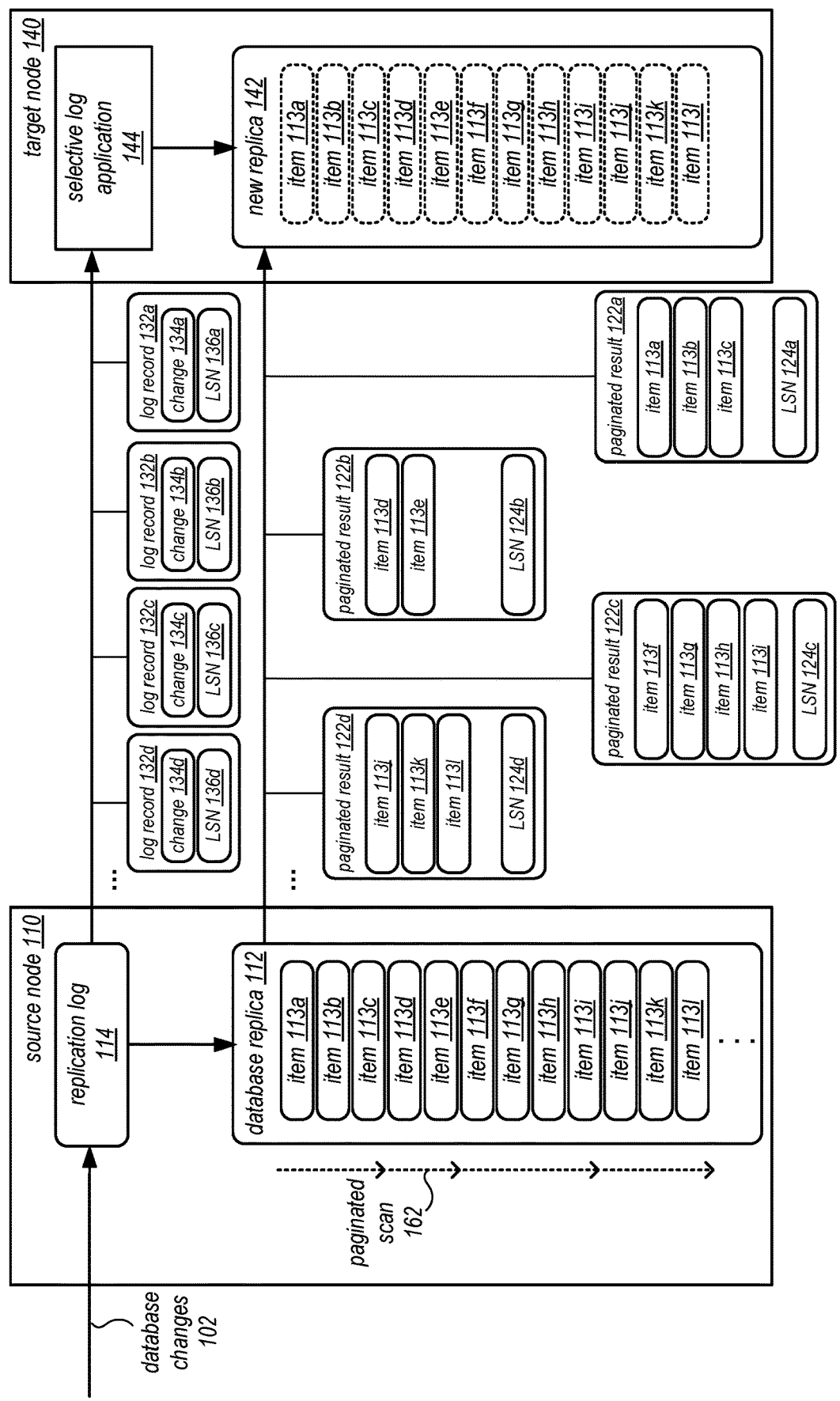
FIG. 1 is a logical block diagram illustrating selectively applying a replication log for logical database replica creation, according to some embodiments.

FIG. 1 is a logical block diagram illustrating selectively applying a replication log for logical database replica creation, according to some embodiments. A database system may store collections of data objects (e.g., records, rows, entries, or other items in tables, buckets, or other containers), in some embodiments. In some embodiments, databases may be non-relational, semi-structured or otherwise organized to not enforce an exact same schema (e.g., same number of attributes) on each item stored as part of the table, in some embodiments. In other embodiments, relational databases or other types of database may structure, relate, or enforce a schema on items in a table.

A replica group for a database system may utilize multiple different nodes, such as source node 110. To add a new replica to the replica group, source node 110 may perform logical replication to a new target storage node 140. For example, source node 110 may perform a paginated scan of database replica 112, as indicated at 112. The results of these scans may provide different items, as indicated at 122a, 122b, 122c, and 122a (providing different ones of items 113a through 113l respectively) as well as log sequence number values 124a, 124b, 124c, and 124d to target node 140. These separate paginated scan results 122 may be provided in response to different scan requests from target node 140, in some embodiments. For example, each paginated result scan request may include a pagination token or other identifier indicating the last item returned from database replica 112.

Target node 140 may store these items in new replica 142 and may implement selective log application 144 to apply replication log 114 that records database changes 102 so that new replica may be made consistent with source node 110 using different application rules, such as those discussed below with regard to FIGS. 5A through 5C. Log records 132 may also be provided, as indicated 132a through 132d with corresponding changes 134a through 134d and respective LSNs 136a through 134d. In this way, the appropriate log records to apply to new replica 142 may be identified and applied even though the log records themselves are not all applied in order.

Please note that previous descriptions of selectively applying a replication log for logical database replica creation are not intended to be limiting, but are merely provided as logical examples. For example, in other embodiments, a source of the database replica and log may be a backup copy in other data store that is not a member of a replica group for the database.

This specification continues with a general description of a provider network that may implement a database service that may selectively apply a replication log for logical database replica creation. Then various examples of a database service are discussed, including different components/modules, or arrangements of components/module, that may be employed as part of implementing the database service, in some embodiments. A number of different methods and techniques to implement selectively applying a replication log for logical database replica creation are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
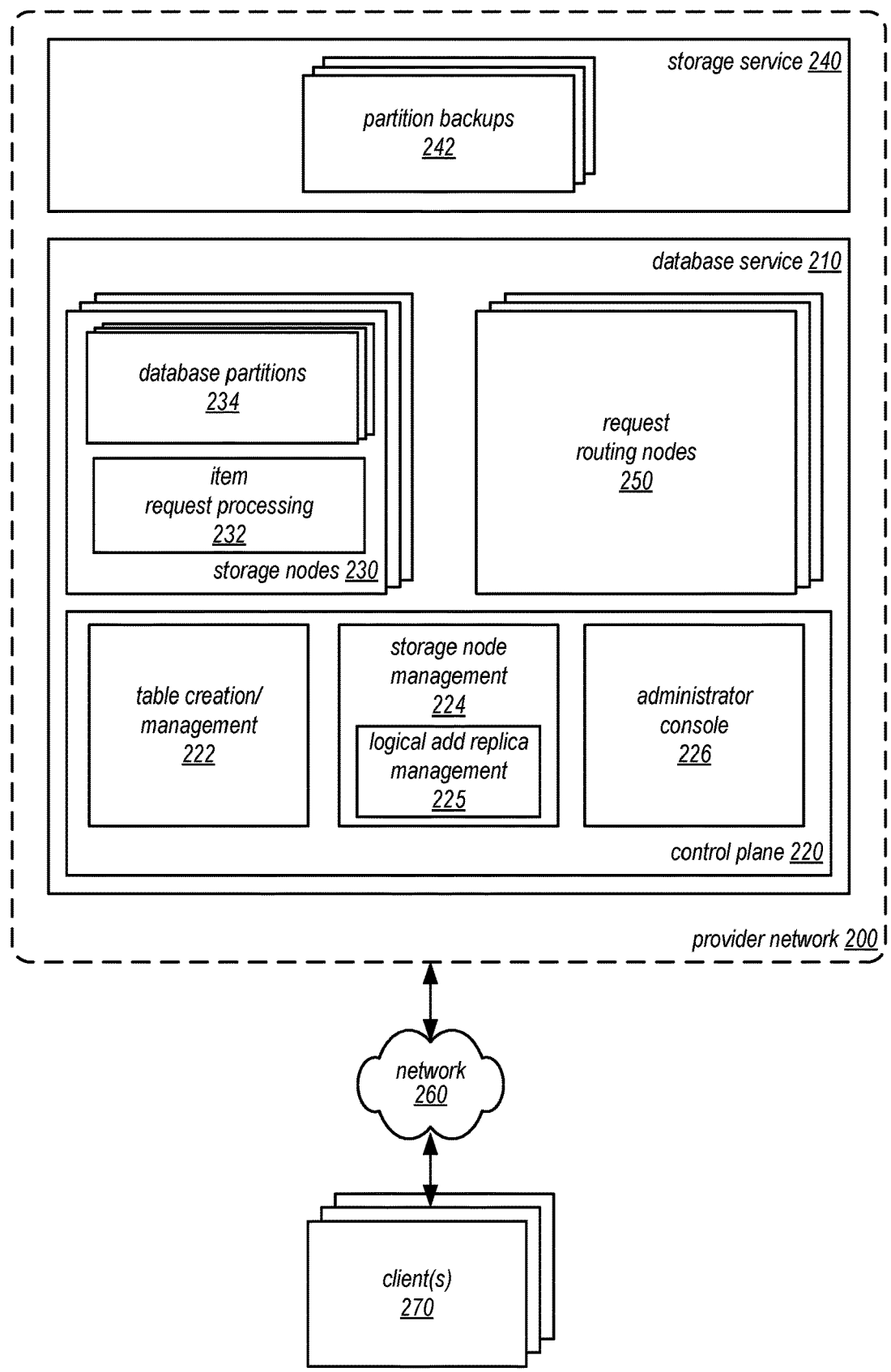
FIG. 2 is a logical block diagram illustrating a provider network offering a database service that may implement selectively applying a replication log for logical database replica creation to add the database replica to a replica group, according to some embodiments.

FIG. 2 is a logical block diagram illustrating a provider network offering a database service that may implement selectively applying a replication log for logical database replica creation to add the database replica to a replica group, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 10 and described below. In some embodiments, the functionality of a given system or service component (e.g., a component of key value database service 210) may be implemented by a particular node or may be distributed across several nodes. In some embodiments, a given node may implement the functionality of more than one service system component (e.g., more than one data store component).

Database service 210 may be implemented various types of distributed database services, in some embodiments, for storing, accessing, and updating data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data).

In some embodiments, clients 270 may encompass any type of client configurable to submit network-based requests to provider network 200 via network 260, including requests for database service 210 (e.g., to access item(s) in a table in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse access requests, in various embodiments in order to determine various features of the request, to parse, authenticate, throttle and/or dispatch access requests, among other things, in some embodiments.

In some embodiments, database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Admin console 226 may allow system administrators to interact directly with database service 210 (and/or the underlying system). In some embodiments, the admin console 226 may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database key-value service 210. For instance, control plane 220 may communicate with processing nodes to initiate the performance of various control plane operations, such as moves of multi-table partitions, splits of multi-table partitions, update tables, delete tables, create indexes, etc. . . . . In some embodiments, control plane 220 may include a node recovery feature or component that handles failure events for storage nodes 230, and request routing nodes 250 (e.g., adding new nodes, removing failing or underperforming nodes, deactivating or decommissioning underutilized nodes, etc.).

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of partition replicas while the source partition replica is live (i.e. while one or more of the replicas of the partition continue to accept and service requests directed to the partition), in some embodiments using logical add replica management 225, as discussed in detail below. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosed in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Because tables may be stored in multi-table partitions, resource allocation for a table to be created may be avoided as multi-partition tables may be updated to handle additional data according to storage node management 224, or other partition management features, in some embodiments.

In some embodiments, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). Item request processing may include processing for sub-tables, as discussed below with regard to FIG. 4.

In some embodiments, database service 210 may provide functionality for creating, accessing, and/or managing tables or secondary indexes at nodes within a multi-tenant environment. For example, database partitions 234 may store table item(s) from multiple tables, indexes 238, or other data stored on behalf of different clients, applications, users, accounts or non-related entities, in some embodiments. Thus database partitions 234 may be multi-tenant, in some embodiments when storing items from different database tables. In some embodiments, an index may include table items 236 (e.g., in a B+ tree).

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210, as discussed below with regard to FIG. 3. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210

(and the underlying storage system) may have no predefined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition sorted files 242 for external storage replica group members as discussed below with regard to FIG. 3. Storage service 240 may implement striping, sharding, or other data distribution techniques so that different portions of a file 242 are stored across multiple locations (e.g., at separate nodes) allowing for parallel reads to perform various operations such as read request handling and new replica creation, as discussed below with regard to FIGS. 4-5B and 9.

Figure 3:
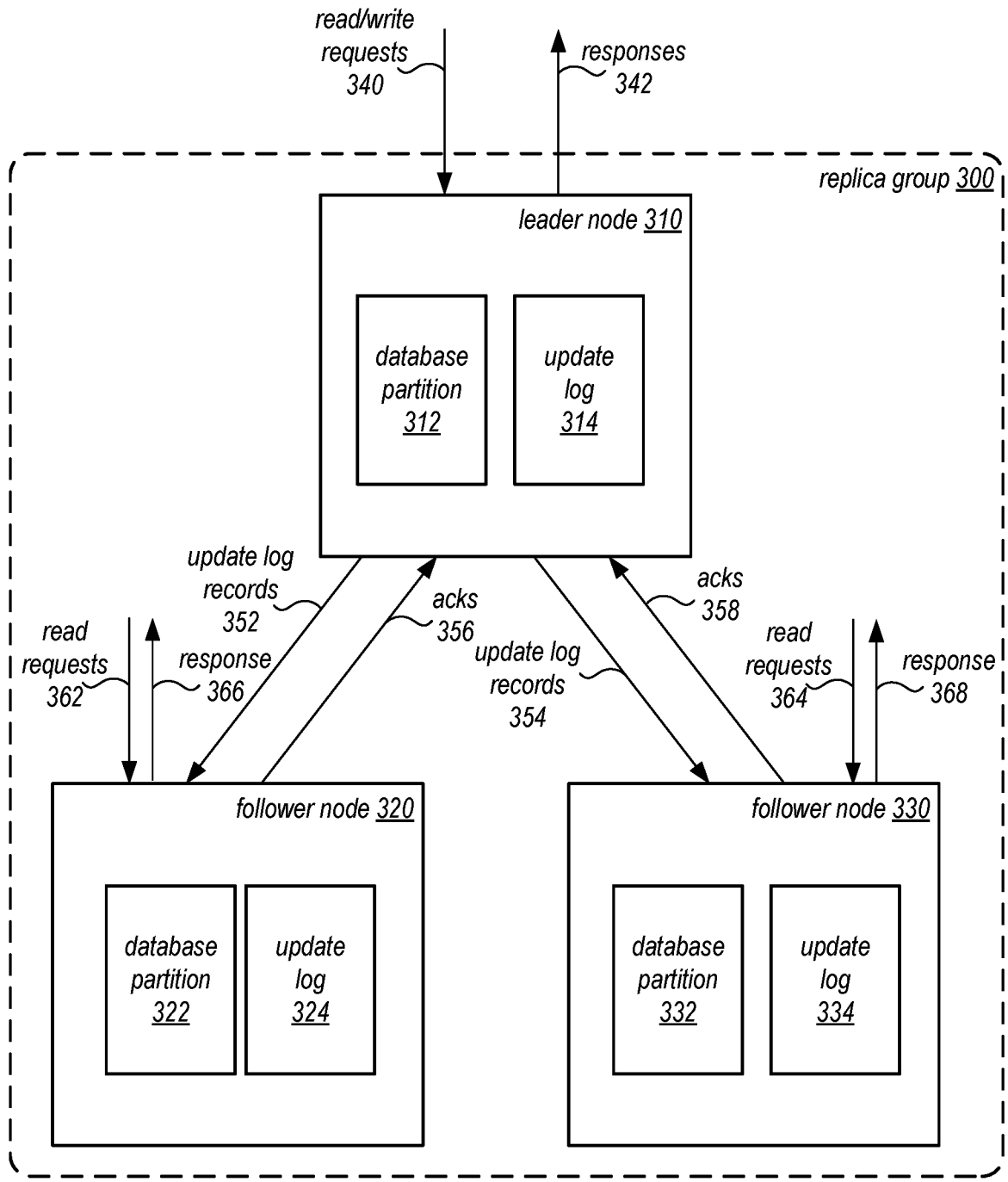
FIG. 3 is a logical block diagram illustrating a replica group for a database, according to some embodiments.

FIG. 3 is a logical block diagram illustrating a replica group for a database, according to some embodiments. Replica group 300 may include multiple storage nodes, such as storage nodes 230 in FIG. 2 above, in various embodiments. In some scenarios, replica group 300 may be only a single node (e.g., in failure modes, degraded modes, or different performance modes (not illustrated). Leader node 310 may accept both read and write requests 340 for the database and return responses 342 to those requests. In various embodiments, leader node 310 may store a database partition 312 to perform the requests and perform reads, as a local storage replica 311.

Leader node 310 may send update log records to follower nodes, such as follower node 320 as indicated at 352 and follower node 330, as indicated at 354. Different types of storage replicas may be implemented at different follower nodes. For example follower node 320 may be a local storage replica 321, which may apply the updates to database partition 322. When updates are applied, follower node 320 may send an acknowledgement of the updates. Similar techniques, as indicated at 364, 368, 354, and 358, for follower node 330.

In some embodiments, follower nodes may perform read requests. For example read requests 364 may be received at follower node 330. Follower node 330 may also create sorted file index structures 334, such as bloom filters or skip lists, to determine which sorted files to read when storing sorted files 336. Thus follower node 330 may access the sorted file index structures 334 to determine which sorted files to read to return a response, as discussed below with regard to FIG. 8. As also discussed below with regard to FIG. 8, in some embodiments, in-memory database data 332 may also store hot (e.g., frequently accessed) items so that they may be cached in memory to answer read requests. In some embodiments, other type of caching strategies, such as cold caches for point queries, may be implemented in addition to or instead of hot data caches. Follower node 320 may also receive read requests and may return a response using database partition 322.

In some embodiments, leader node 310 may truncate or remove old log records from update log 314 when acknowledged (e.g., 356 and 358) by each follower node. In some embodiments, follower node 330 may not acknowledge 358 until the log records are stored as sorted files 372.

Figure 4:
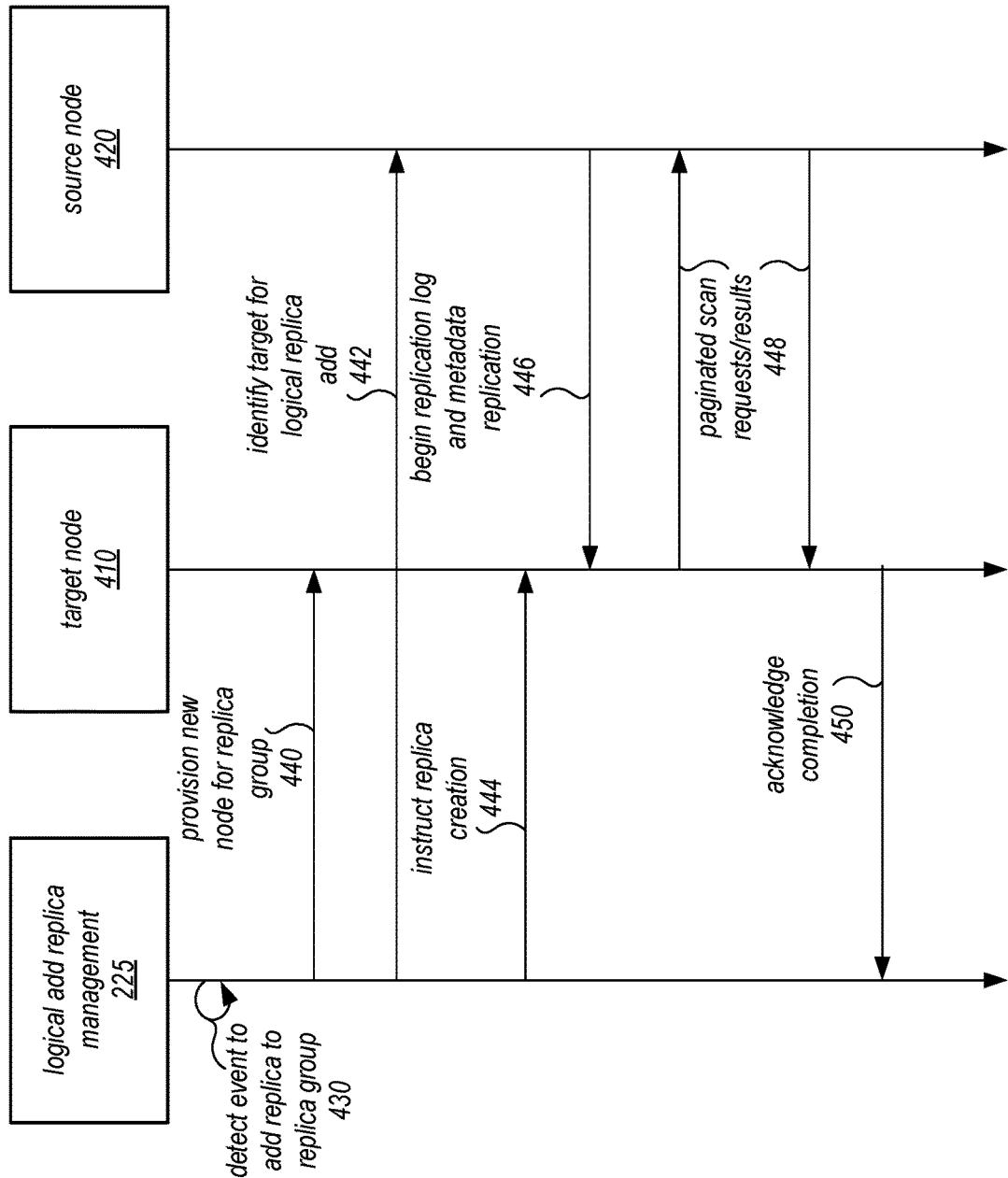
FIG. 4 is a logical block diagram illustrating interactions to add a replica to a replica group, according to some embodiments.

FIG. 4 is a logical block diagram illustrating interactions to add a replica to a replica group, according to some embodiments. As indicated at 430, logical add replica management 225 may detect an event to add a replica to a replica group, in some embodiments (e.g., according to the various conditions discussed below with regard to FIG. 8). Logical add replica management 225 may send or otherwise provision 440 a new node for the replica group to be a target node 410. Logical add replica management 225 may send a request 442 to source node 420 for the replica group to identify target node 410 as part of the replica group, in some embodiments. As indicated at 444, logical add replica management 225 may send a replica creation instruction 446 to target node 410.

As indicated at 446, source node 420 may begin replicating metadata and the replication log to target node 410, which may then perform paginated scan requests to source node 420, which may return paginated results, as discussed above with regard to FIG. 1 and below with regard to FIG. 9. Although not illustrated in FIG. 4, similar techniques could be repeated or performed in parallel with additional target nodes. Moreover, such techniques may be performed using a source that is not a storage node, such as a backup copy stored in storage service 240 (e.g., partition backups 242). In such embodiments the target node may perform the scan, by reading from the partition backup a certain number of items and then storing the result and selectively applying a log, as discussed above.

Figure 5A:
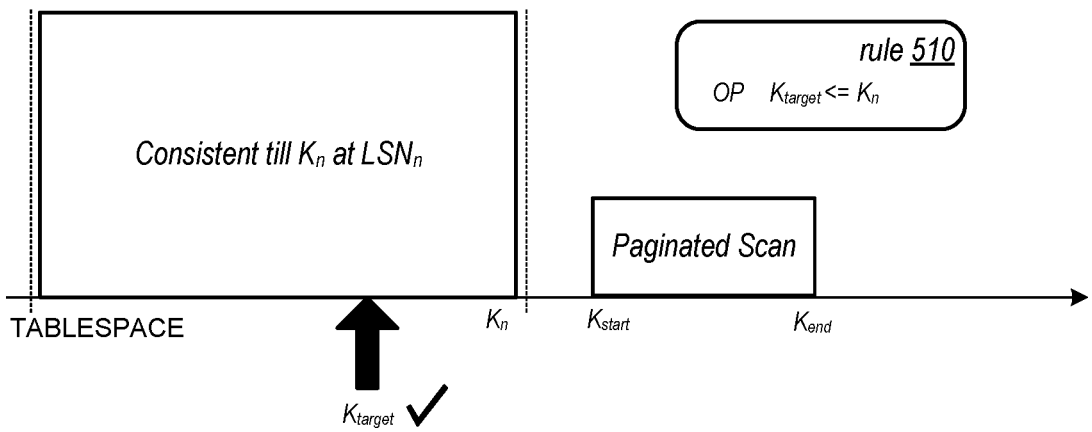
FIGS. 5A-5C illustrate different application rules for applying a replication log to paginated results, according to some embodiments.

FIG. 5A illustrates one example application rule for applying log records. In this example, an operation "OP" is a change that may be applied if the target of the operation is a in a consistent range already stored then the OP may be applied, as depicted in FIG. 5A, as described in rule 510. For example, this allows for log records that describe changes to items already stored in a new replica that occur after the LSN value of the new replica to be applied to those items, bringing the LSN value of the new replica up to the LSN value of the last applied log record. This would exclude log records that have LSNs less than the LSN value of the new replica (as those changes would already be present, or would have been present and then subsequently changed again, for instance).

Figure 5B:
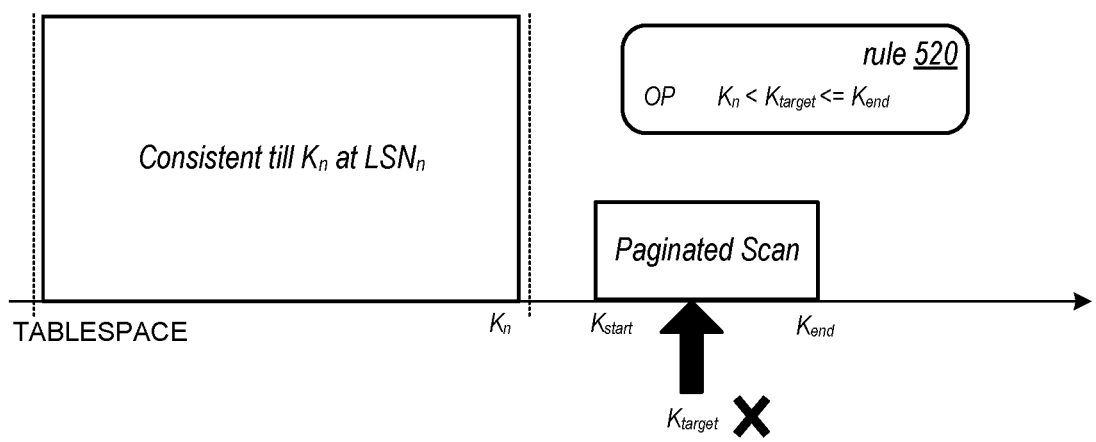

FIG. 5B illustrates another example application rule for applying log records. In this example, if a targeted item of a change, OP, as indicated by $K_n$, is within the scan range, then log record is not to be applied, as indicated by rule 520. For example, this rule would prevent log records from describing changes to items in a paginated scan with an LSN value greater than the LSN of the log record being considered for the item in the paginated scan result. This would, for instance, prevent a later version of an item retrieved in a paginated scan result from being overwritten according to an earlier change in the log.

Figure 5C:
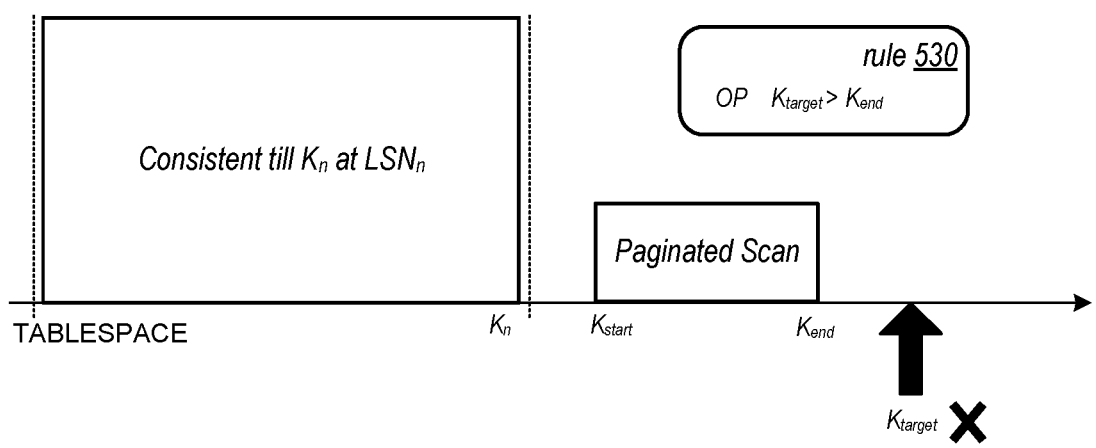

FIG. 5C illustrates another example application rule for applying log records. In this example, if a targeted item of a change, OP, as indicated by $K_n$, is ahead of the scan range, then log record is not to be applied, as indicated by rule 530. For example, this rule would prevent log records for items not yet present in the new replica from being considered, as there is not such item to change in the new replica.

Figure 6:
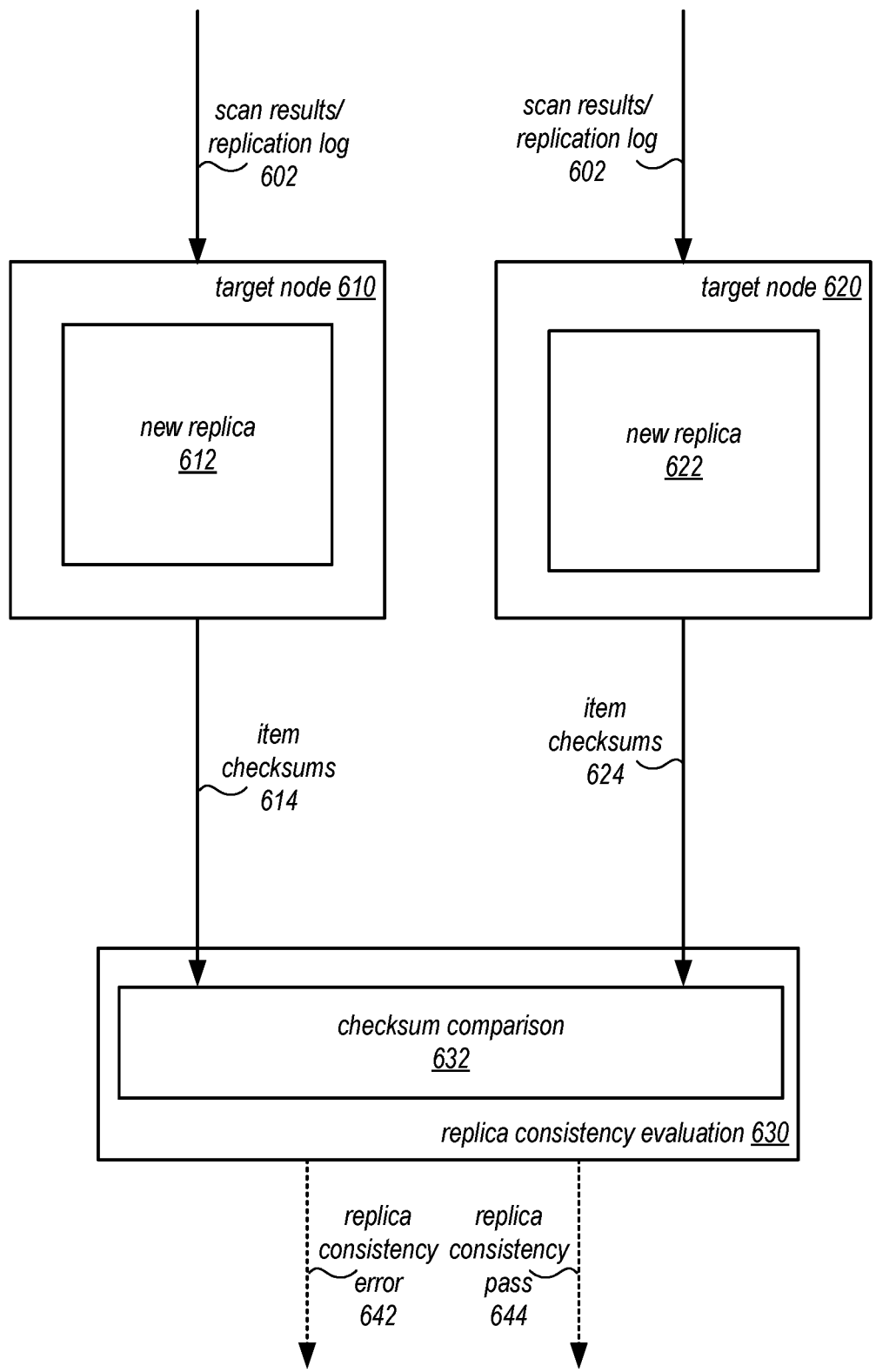
FIG. 6 is a logical block diagram illustrating replica consistency evaluation, according to some embodiments.

In various scenarios, logical replication techniques may be performed to create multiple replicas to add to a replica group. In such scenarios, it may be beneficial to create a consistency evaluation or other check on replication performance to provide further assurance that replicas when created and added are consistent. FIG. 6 is a logical block diagram illustrating replica consistency evaluation, according to some embodiments. Both target nodes 610 and 620 may be creating new replicas 612 and 622 respectively using scan results and replication log received, as indicated at 602, according to the techniques discussed above.

Database service 210 may implement a replica consistency evaluation component 630 (e.g., which may be implemented as part of a control plane like control plane 220). This replica consistency evaluation component 630 may accept item checksums from new replicas 612 and 614 respectively, as indicated at 614 and 624, and perform checksum comparison 632. A mismatch in checksum values may indicate a replication inconsistency, which may be reported (e.g., to control plane 220) as replica consistency error 642). Alternatively, for replicas that complete creation with no errors, an indication of replica consistency pass 644 may be sent.

Figure 7:
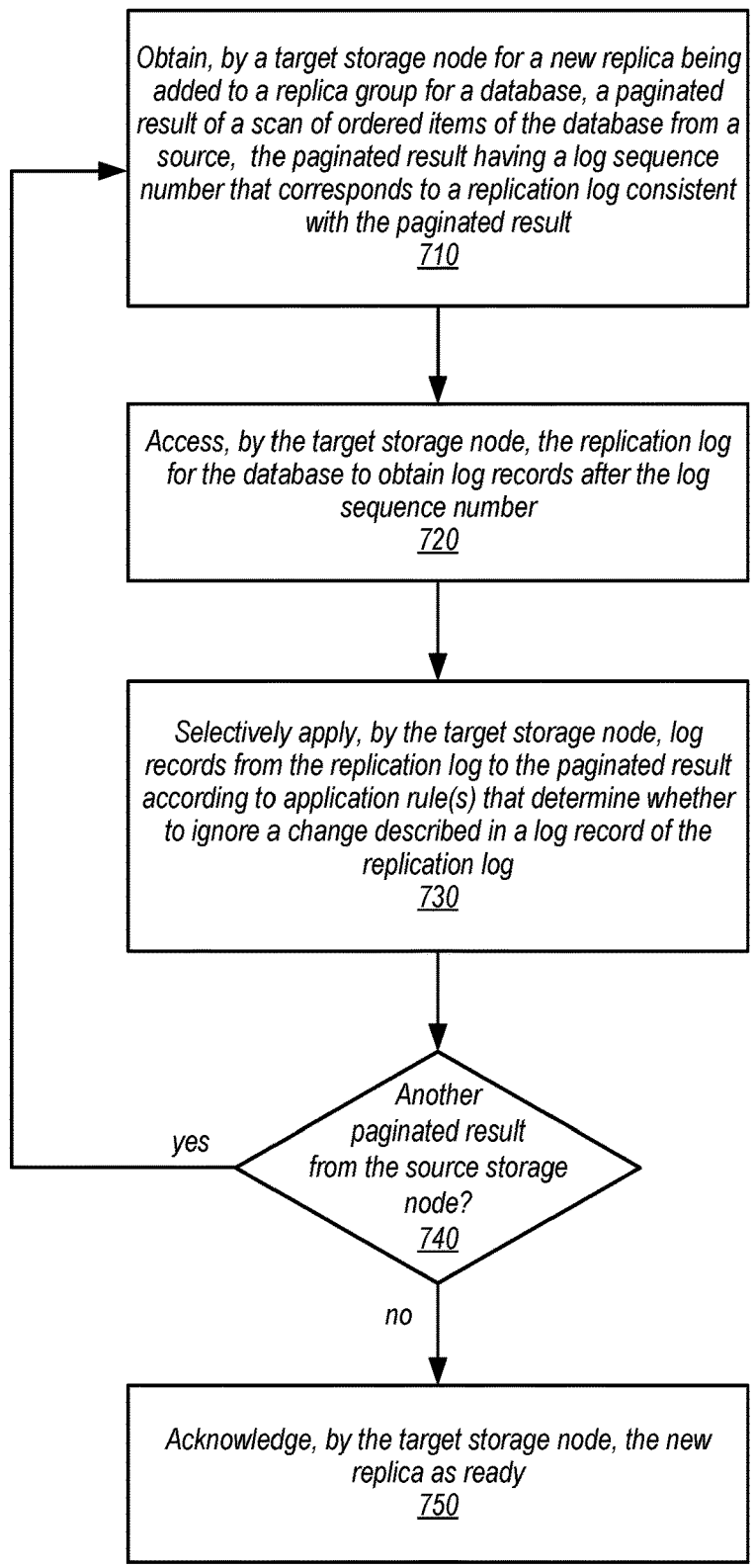
FIG. 7 is a high-level flowchart illustrating various methods and techniques to implement selectively applying a replication log for logical database replica creation, according to some embodiments.

The examples of a database service that implement selectively applying a replication log for logical database replica creation as discussed in FIGS. 2-6 above have been given in regard to a database service (e.g., a relational database, non-relational, or other type of database service). However, various other types of database systems that can advantageously implement a replica group may implement different types of index structures for storing database data in a replica group, in other embodiments. FIG. 7 is a high-level flowchart illustrating various methods and techniques to implement selectively applying a replication log for logical database replica creation, according to some embodiments. These techniques, as well as the techniques discussed with regard to FIGS. 8-9, may be implemented using components or systems as described above with regard to FIGS. 2-6, as well as other types of databases or storage systems, and thus the following discussion is not intended to be limiting as to the other types of systems that may implement the described techniques.

As indicated at 710, a target storage node for a new replica being added to a replica group may obtain a paginated result of a scan of ordered items of the database from a source storage node of the replica group. For example, as discussed above, a programmatic interface command, remote procedure call, connected drivers, connectors, or various other components may be implemented to support communications between the target storage node and the source storage node. A request for a paginated scan may be sent from the target storage node to the source storage node to initiate (or continue) the scan operation. A token, cursor, or other indicator of received items from a prior scan result may be included in some embodiments (or in the case of a first request a "null" value, initial value (e.g., "0"), or no value at all) may be included to indicate to the source storage node which items to return in the paginated result. The paginated result may have a log sequence number that corresponds to a replication log consistent with the paginated result.

As indicated at 720, the target storage node may access the replication log for the database. For example, the target storage node may request (or receive as a participant in a replication protocol for the database) the replication log, either in part, or as a whole). In some embodiments, an initial portion of the replication log may be received and then further additions to the replication log may be appended (e.g., added to the replication log to record further changes to the database, which may have been received after additional of the new replica is begun). In some embodiments, the replication log to obtain log records after the log sequence number for the paginated result.

As indicated at 730, the target storage node may selectively apply log records from the log record to the paginated result according to one or more application rules that determine whether to ignore a change described in a log record of the obtained replication log records after the log sequence number for the paginated result according to the log sequence number of the paginated result. As discussed in detail above with regard to FIGS. 5A through 5C, different application rules may be used.

As indicated at 740, if another paginated result from the source storage node is available, then elements 710 through 730 may be repeated. For example, a paginated result may include a pagination token or other indication that a further result is available. If such a token or indication is included, then the target storage node may determine to make another paginated result request.

If no further paginated result is available, as indicated by the negative exit from 740, then the target storage node may acknowledge the new replica as ready, in some embodiments, as indicated at 750.

Figure 8:
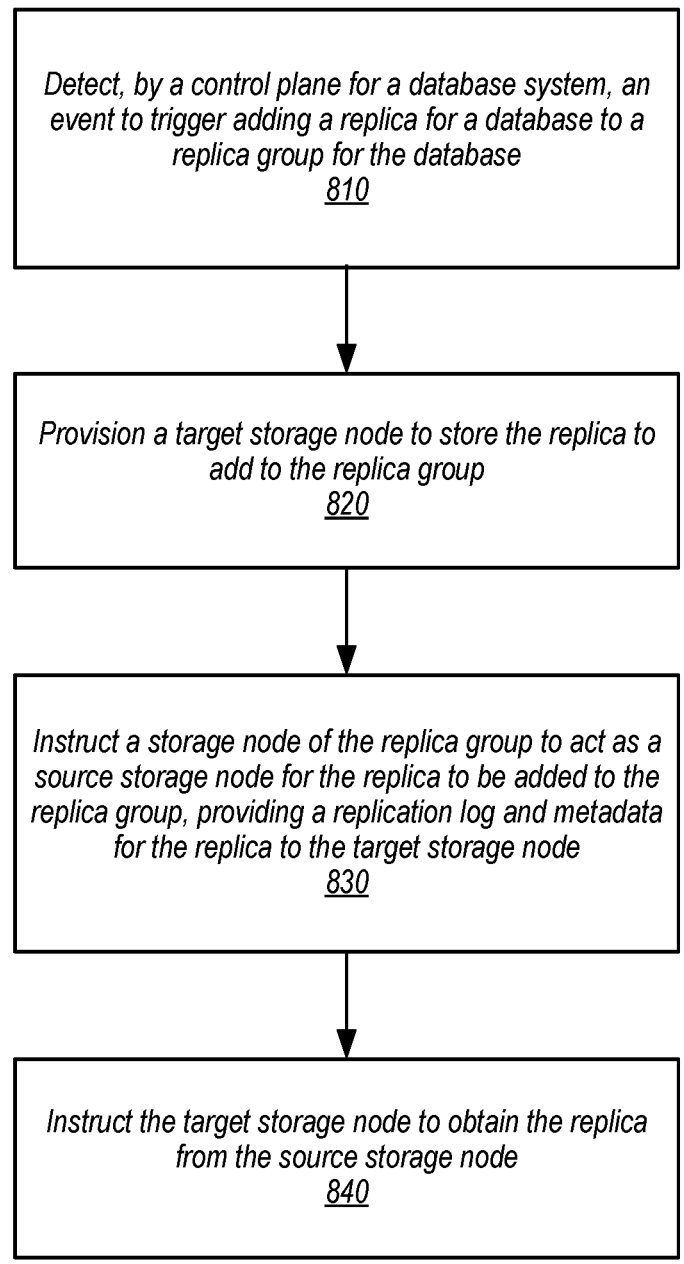
FIG. 8 is a high-level flowchart illustrating various methods and techniques to implementing detecting and adding a replica to a replica group for a database, according to some embodiments.

FIG. 8 is a high-level flowchart illustrating various methods and techniques to implement detecting and adding a replica to a replica group for a database, according to some embodiments. As indicated at 810, a control plane for a database system may detect an event to trigger adding a replica for a database to a replica group for the database. For example, storage node failure of a replica group (or network partition that makes a storage node of a replica group unable to communicate or otherwise unavailable) may be detected. In some embodiments, a request to increase durability or availability of the database may also be an event that triggers adding a replica.

As indicated at 820, a target storage node may be provisioned to store the replica to add to the replica group, in some embodiments. For example, a placement strategy may be evaluated to determine an optimal storage location for the replica (e.g., in a different availability zone or other storage location than other replicas in the replica group). In some embodiments, the target storage node may be a multi-tenant storage node, also storing or managing access to data for other databases of the database system. The workload or utilization of the target storage node as well as other available storage nodes may be considered as part of the placement strategy.

As indicated at 830, a storage node of the replica group may be instructed to act as a source storage node for the replica to be added to the replica group, in some embodiments. The source storage node may provide metadata for the replica (e.g., various indices, statistics, configuration information, etc.) as well as begin replicating the replication log (e.g., sending a current state of the replica log and then replicating further changes to the target storage node).

As indicated at 840, the target storage node may be instructed to obtain the replica from the source storage node, in some embodiments. For example, a table (or multiple tables), as well as various other information that identifies the items to obtain for the replica may be provided. In some embodiments, source storage nodes may change (e.g., a source storage node may fail or become overburdened so that another source storage node of the replica group may be selected). Therefore the instruction, as indicated at 840, may be sent multiple times to change source storage nodes (as well as the instruction to provide the replication log metadata), in some embodiments.

Figure 9:
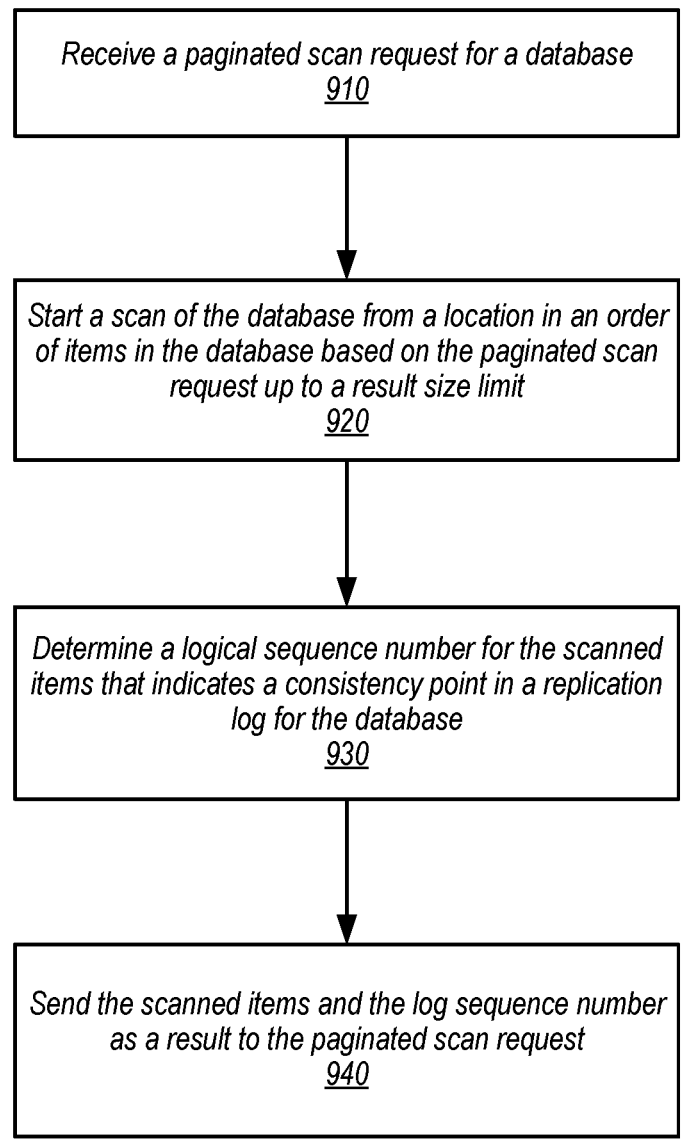
FIG. 9 is a high-level flowchart illustrating various methods and techniques to implement performing a paginated scan operation for logical replication that selectively applies a replication log to paginated results, according to some embodiments.

FIG. 9 is a high-level flowchart illustrating various methods and techniques to implement performing a paginated scan operation for logical replication that selectively applies a replication log to paginated results, according to some embodiments. As indicated at 910, a request for a paginated scan for a database may be received at a storage node, in some embodiments. For example, the request may be formatted according to an API or other programmatic interface, which may include a prior result state information, such as a pagination token which indicates a last item sent.

As indicated at 920, a scan of the database may be started from a location in an order of items in the database based on the paginated scan request up to a result size limit, in some embodiments.

As indicated at 930, a determination may be made as to a log sequence number for the scanned items that indicates a consistency point in a replication log for the database, in some embodiments. For example, the replication log may be applied to the database as changes to the database are received and committed or otherwise acknowledged as performed to a client application that submitted the changes. A most recent log sequence number of the replication applied to the database as of the scanning the items up to the result size limit (which may be locked or otherwise unable to be changed once the scanning begins) may be determined.

As indicated at 940, the scanned items and the log sequence number may be sent as a result to the paginated scan request, in some embodiments.

The methods described herein may in various embodiments be implemented by any combination of hardware and software. For example, in some embodiments, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
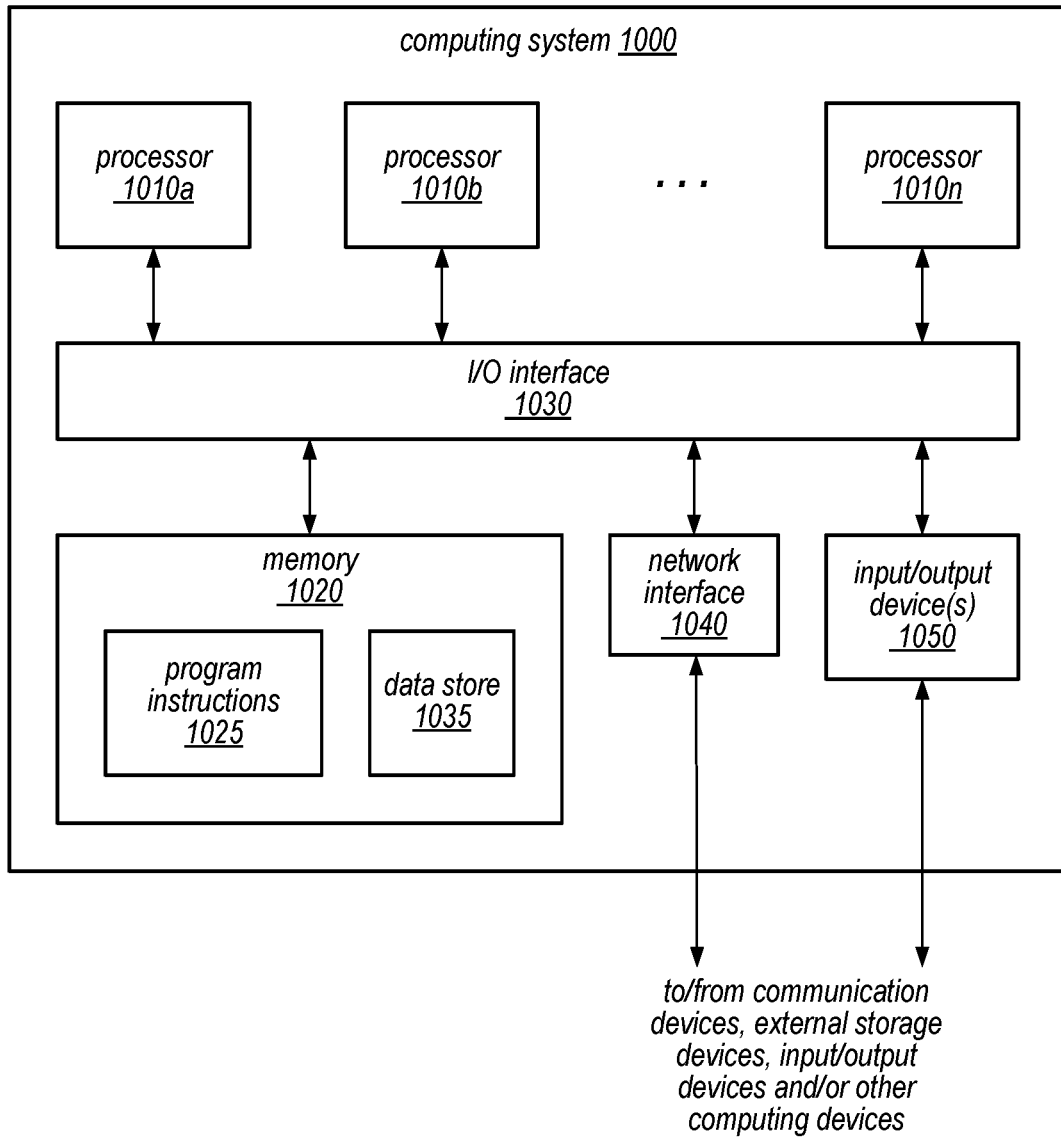
FIG. 10 is a block diagram illustrating an example computing system, according to some embodiments.

Embodiments to implement selectively applying a replication log for logical database replica creation as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement different types of index structures for storing database data in a replica group, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing devices, configured to implement a database service that hosts a database, wherein the database service comprises a control plane and one or more storage nodes that implement a replica group that maintain respective replicas of the database;
wherein the control plane is configured to add a new replica to the replica group for the database, wherein to add the new replica, the control plane is configured to identify a target storage node for the new replica;
wherein the target storage node is configured to:
send a plurality of requests to obtain paginated results of a scan of ordered items of the database to store in the new replica from a source storage node of the one or more storage nodes of the replica group, wherein individual results of the paginated results correspond to respective log sequence numbers of log records in a replication log consistent with the paginated results, wherein the replication log describes an order of changes applied to the database;
store the paginated results in the new replica;
obtain the replication log for the database from the source storage node between a consistent state of the database already stored and the log sequence number value for the paginated result; and
selectively apply log records from the replication log to individual results of the paginated results according to one or more application rules that determine whether to ignore a change described in a log record of the replication log.

2. The system of claim 1, wherein the source storage node is configured to:
receive one more requests from the target storage node for respective ones of the paginated results;
scan one or more of the items of the database from a determined starting location up to a result size limit;
determine a log sequence number for the scanned items; and
return the scanned items and the log sequence number to the target storage node as one of the paginated results.

3. The system of claim 1, wherein the control plane is further configured to modify resource allocations at the source storage node to provide the paginated results to the target storage node.

4. The system of claim 1, wherein the target storage node is further configured to send checksum values for items stored in the new replica to be compared with other checksum values for other items stored as part of another new replica at another target storage node to determine replication consistency between the target storage node and the other target storage node.

5. A method, comprising:
adding, by a database system, a new replica for a database to a replica group for the database, comprising:
obtaining, by a target storage node for the new replica, paginated results of a scan of ordered items of the database to store in the new replica from a source that maintains an existing replica for the database, wherein individual results of the paginated results correspond to respective log sequence numbers of log records in a replication log consistent with the paginated results, wherein the replication log describes an order of changes applied to the database;
obtaining, by the target storage node, the replication log for the database between a consistent state of the database already stored and the log sequence number value for the paginated result; and
selectively applying, by the target storage node, log records from the replication log to individual results of the paginated results according to one or more application rules that determine whether to ignore a change described in a log record of the replication log.

6. The method of claim 5, wherein one of the application rules causes a log record to be included when the target item of the log record is an item within the consistent state of the database already stored at the new replica, wherein a log sequence number of the log record is greater than a log sequence number of the consistent state of the database.

7. The method of claim 5, wherein one of the application rules causes a log record to be ignored when the target item of the log record is an item within the paginated results of items to be stored at the new replica, wherein a log sequence number of the log record is greater lesser than a log sequence number of the consistent state of the database.

8. The method of claim 5, wherein one of the application rules causes a log record to be ignored when the target item of the log record is an item not in a consistent state of the database already stored at the new replica the and not in the paginated results of items to be stored at the new replica.

9. The method of claim 5, wherein the source is a storage node of the replica group, and wherein the method further comprises:
receiving, at the source storage node, one more requests from the target storage node for respective ones of the paginated results;
scanning, by the source storage node, one or more of the items of the database from a determined starting location up to a result size limit;
determining, by the source storage node, a log sequence number for the scanned items; and
returning, by the source storage node, the scanned items and the log sequence number to the target storage node as one of the paginated results.

10. The method of claim 5, further comprising:
detecting, by a control plane for the database system, an event to add the new replica to the replica group;
provisioning, by the control plane for the database system, the target storage node according to a placement strategy; and
instructing, by the control plane for the database system, the source storage node to begin replication of the replication log; and
instructing, by the control plane for the database system, the target storage node to obtain the replica from the source storage node.

11. The method of claim 5, wherein a storage engine for the target storage node is a different type of storage engine than a storage engine for the source storage node.

12. The method of claim 5, modifying, by a control plane for the database system, resource allocations at the source storage node to provide the paginated results to the target storage node.

13. The method of claim 5, wherein the database system is a non-relational database service implemented as part of a provider network.

14. One or more non-transitory, computer-readable storage media, storing program instructions that when executed on or across one or more computing devices cause the one or more computing devices to implement:
sending, by a target storage node for a new replica to be added to a replica group for a database, a plurality of requests to obtain paginated results of a scan of ordered items of the database to store in the new replica from a source that maintains an existing replica for the database, wherein individual results of the paginated results correspond to respective log sequence numbers of log records in a replication log consistent with the paginated results, wherein the replication log describes an order of changes applied to the database;
storing, by the target storage node, the paginated results in the new replica;
obtaining, by the target storage node, the replication log for the database between a consistent state of the database already stored and the log sequence number value for the paginated result; and
selectively applying, by the target storage node, log records from the replication log to individual results of the paginated results according to one or more application rules that determine whether to ignore a change described in a log record of the replication log.

15. The one or more non-transitory, computer-readable storage media of claim 14, wherein one of the application rules causes a log record to be included when the target item of the log record is an item within the consistent state of the database already stored at the new replica, wherein a log sequence number of the log record is greater than a log sequence number of the consistent state of the database.

16. The one or more non-transitory, computer-readable storage media of claim 14, wherein one of the application rules causes a log record to be ignored when the target item of the log record is an item within the paginated results of items to be stored at the new replica, wherein a log sequence number of the log record is greater lesser than a log sequence number of the consistent state of the database.

17. The one or more non-transitory, computer-readable storage media of claim 14, wherein one of the application rules causes a log record to be ignored when the target item of the log record is an item not in a consistent state of the database already stored at the new replica the and not in the paginated results of items to be stored at the new replica.

18. The one or more non-transitory, computer-readable storage media of claim 14, wherein the source is a source storage node of the replica group and wherein the one or more non-transitory, computer-readable storage media store further instructions that when executed on or across the one or more computing devices, cause the one or more computing devices to further implement:
receiving, at the source storage node, one more requests from the target storage node for respective ones of the paginated results;
scanning, by the source storage node, one or more of the items of the database from a determined starting location up to a result size limit;
determining, by the source storage node, a log sequence number for the scanned items; and
returning, by the source storage node, the scanned items and the log sequence number to the target storage node as one of the paginated results.

19. The one or more non-transitory, computer-readable storage media of claim 14, wherein a storage engine for the target storage node is a different type of storage engine than a storage engine for the source storage node.

20. The one or more non-transitory, computer-readable storage media of claim 14, sending, by the target storage node, checksum values for items stored in the new replica to be compared with other checksum values for other items stored as part of another new replica at another target storage node to determine replication consistency between the target storage node and the other target storage node.

* * * * *